United States Patent
Robert et al.

(10) Patent No.: US 11,973,969 B2
(45) Date of Patent: Apr. 30, 2024

(54) METHOD AND APPARATUS FOR VIDEO ENCODING AND DECODING USING LIST OF PREDICTOR CANDIDATES

(71) Applicant: InterDigital Madison Patent Holdings, SAS, Paris (FR)

(72) Inventors: Antoine Robert, Mezieres sur Couesnon (FR); Fabrice Leleannec, Mouaze (FR); Franck Galpin, Thorigne-Fouillard (FR)

(73) Assignee: InterDigital Madison Patent Holdings, SAS, Paris (FR)

( * ) Notice: Subject to any disclaimer, the term of this patent is extended or adjusted under 35 U.S.C. 154(b) by 0 days.

(21) Appl. No.: 17/281,124

(22) PCT Filed: Oct. 1, 2019

(86) PCT No.: PCT/US2019/053933
§ 371 (c)(1),
(2) Date: Mar. 29, 2021

(87) PCT Pub. No.: WO2020/072401
PCT Pub. Date: Apr. 9, 2020

(65) Prior Publication Data
US 2021/0360273 A1 Nov. 18, 2021

(30) Foreign Application Priority Data

Oct. 2, 2018 (EP) .................................... 18306293

(51) Int. Cl.
*H04N 19/503* (2014.01)
*H04N 19/176* (2014.01)

(52) U.S. Cl.
CPC ......... *H04N 19/503* (2014.11); *H04N 19/176* (2014.11)

(58) Field of Classification Search
None
See application file for complete search history.

(56) References Cited

U.S. PATENT DOCUMENTS 11,019,357 B2 * 5/2021 Han .................. H04N 19/61
2009/0278988 A1 * 11/2009 Bhagavathy ............ G06T 5/20
348/E5.022

(Continued)

FOREIGN PATENT DOCUMENTS

CN 105187838 A 12/2015
CN 108353184 A 7/2018

OTHER PUBLICATIONS

Anonymous, "Information Technology—Generic Coding of Moving Pictures and Associated Audio Information: Video", International Organization for Standardization (ISO) and the International Electrotechnical Commission (IEC), International Standard 13818-2, Recommendation ITU-T H.262, Document ISO 13818-2: 1995 (E), 1995, 255 pages.

(Continued)

*Primary Examiner* — Chikaodili E Anyikire
(74) *Attorney, Agent, or Firm* — Smadar Gefen

(57) ABSTRACT

At least a method and an apparatus are presented for efficiently encoding or decoding video. For example, for a block being encoded, a set of predictor candidates is determined. For a current potential predictor candidate in a set of potential predictor candidates, it is determined that the current potential predictor candidate is different from any predictor candidate in a subset of predictor candidates from the set of predictor candidates and in response the current potential predictor candidate is added to the set of predictor candidates. Thus, the set of predictor candidates is pruned with partial comparison in the set. The block is encoded or decoded based on a predictor candidate from pruned set of predictor candidates.

20 Claims, 12 Drawing Sheets

(56) References Cited

U.S. PATENT DOCUMENTS

| | | | |
|---|---|---|---|
| 2011/0194609 A1 | 8/2011 | Rusert et al. | |
| 2013/0083853 A1 | 4/2013 | Coban et al. | |
| 2014/0064372 A1* | 3/2014 | Laroche | H04N 19/176 375/240.16 |
| 2014/0098882 A1 | 4/2014 | Zhang et al. | |
| 2015/0195566 A1* | 7/2015 | Hinz | H04N 19/119 375/240.12 |
| 2018/0070100 A1* | 3/2018 | Chen | H04N 19/174 |
| 2021/0274175 A1* | 9/2021 | Lim | H04N 19/167 |

OTHER PUBLICATIONS

Chen, Huanbang, etc., "CE4: Affine merge enhancement (Test 2.10)", Joint Video Experts Team (JVET) of ITU-T 16 WP 3 and ISO/IEC JTC 1/SC 29/WG 11, Document: JVET-K0186-v3, 11th Meeting, Ljubljana, Slovenia, Jul. 10, 2018, 6 pages.

Rosewarne et al., "High Efficiency Video Coding (HEVC) Test Model 16 (HM16) Improved Encoder Description Update 7", International Organization for Standardization, ISO/IEC JTC1/SC29/WG11, Coding of Moving Pictures and Audio, Document ISO/IEC JTC1/SC29/WG11, Document: JCTVC-Y1002, 25th Meeting: Chengdu, China, Oct. 14, 2016, 70 pages.

Anonymous, "Transmission of Non-Telephone Signals: Information Technology—Generic Coding of Moving Pictures and Associated Audio Information: Systems", International Telecommunication Union, ITU-T Telecommunication Standardization Sector of ITU, Recommendation ITU-T H.222.0, Jul. 1995, 135 pages.

Anonymous, "Series H: Audiovisual and Multimedia Systems, Infrastructure of audiovisual services—Coding of moving video—Reference software for ITU-T H.265 high efficiency video coding", International Telecommunication Union, ITU-T Telecommunication Standardization Sector of ITU, Recommendation ITU-T H.265.2, Oct. 2014, 12 pages.

Chen et al., "Description of SDR, HDR and 360 video coding by Qualcomm and Technicolor-low and high complexity versions", Joint Video Exploration Team (JVET) of ITU-T SG 16 WP 3 and ISO/IEC JTC 1/SC 29/WG 11, Document: JVET-J0021, 10TH Meeting: San Diego, California, USA, Apr. 10-20, 2018, 43 pages.

Yang, Haitao, et al., "Description of Core Experiment 4 (CE4): Inter prediction and motion vector coding", JVET of ITU-T SG16 WP3 and ISO/IEC JTC 1/SC 29WG 11, 11th Meeting: Ljubljana, SI, Jul. 10-18, 2018, Document: JVET-K1024-v2, 46 pages.

Yang et al. "Description of Core Experiment 4 (CE4): Inter prediction and motion vector coding", Joint Video Experts Team (JVET) of ITU-T SG 16 WP 3 and ISO/IEC JTC 1/SC 29/WG 11, Document: JVET-K1024-v3, 11th Meeting: Ljubljana, Slovenia, Jul. 10, 2018, 45 pages.

Xu, Liying, et al., "Candidate list reordering", JVET of ITU-T SG16 WP3 and ISO/IEC JTC 1/SC 29/WG 11, 11th Meeting: Ljubjana, Slovenia, Jul. 10, 2018, Document: JVET-K00650-v4, 6 pages.

* cited by examiner

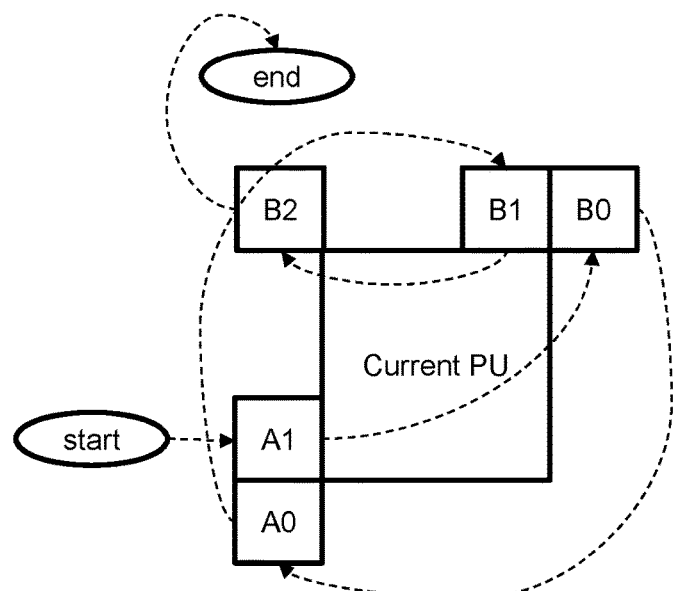
Figure 8
Figure 9
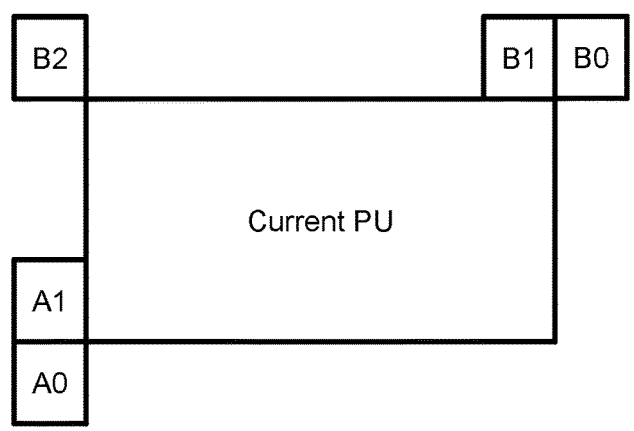
Figure 10

| Mode I nb | 1 | 2 | 3 | 4 | 5 | 6 | 7 | 8 | 9 | 10 |
|---|---|---|---|---|---|---|---|---|---|---|
| 1 | 0 | 2 | 2 | 2 | 1 | 1 | 1 | 3 | 3 | 4 |
| 2 | 2 | 0 | 2 | 2 | 3 | 3 | 3 | 1 | 1 | 4 |
| 3 | 2 | 2 | 0 | 2 | 5 | 1 | 3 | 1 | 3 | 1 |
| 4 | 2 | 2 | 2 | 0 | 5 | 3 | 1 | 3 | 1 | 2 |
| 5 | 1 | 3 | 5 | 5 | 0 | 2 | 2 | 4 | 4 | 7 |
| 6 | 1 | 3 | 1 | 3 | 2 | 0 | 2 | 2 | 4 | 2 |
| 7 | 1 | 3 | 3 | 1 | 2 | 2 | 0 | 4 | 2 | 3 |
| 8 | 3 | 1 | 1 | 3 | 4 | 2 | 4 | 0 | 2 | 2 |
| 9 | 3 | 1 | 3 | 1 | 4 | 4 | 2 | 2 | 0 | 3 |
| 10 | 4 | 4 | 1 | 2 | 7 | 2 | 3 | 2 | 3 | 0 |

Figure 16

METHOD AND APPARATUS FOR VIDEO ENCODING AND DECODING USING LIST OF PREDICTOR CANDIDATES

CROSS-REFERENCE TO RELATED APPLICATIONS

This application is a 35 U.S.C. § 371 National Stage of PCT Application No. PCT/US2019/053933, filed Oct. 1, 2019, which claims priority to EP patent application 18306293.4, filed Oct. 2, 2018, the contents of all of which are hereby incorporated by reference herein in their entireties.

TECHNICAL FIELD

At least one of the present embodiments generally relates to a method or an apparatus for video encoding or decoding, and more particularly, to a method or an apparatus for efficiently pruning a list of predictor candidates for the video encoding or decoding.

BACKGROUND

To achieve high compression efficiency, image and video coding schemes usually employ prediction, including motion vector prediction, and transform to leverage spatial and temporal redundancy in the video content. Generally, intra or inter prediction is used to exploit the intra or inter frame correlation, then the differences between the original image and the predicted image, often denoted as prediction errors or prediction residuals, are transformed, quantized, and entropy coded. To reconstruct the video, the compressed data are decoded by inverse processes corresponding to the entropy coding, quantization, transform, and prediction.

A recent addition to high compression technology includes various motion models used for motion compensation in encoding and decoding of video pictures. In general, an index in a list of predictor candidate is used for motion prediction and the number of predictor candidates in the list is increased for improving the compression efficiency. At least some embodiments further relate to motion compensation in the video compression scheme using list of predictor candidates.

SUMMARY

The drawbacks and disadvantages of the prior art are solved and addressed by the general aspects described herein, which are directed to having efficiently pruning a list of predictor candidates for the video encoding or decoding.

According to a first aspect, there is provided a method. The method comprises determining, for a block being encoded, a set of predictor candidates, wherein for at least one current potential predictor candidate in a set of potential predictor candidates, determining the current potential predictor candidate is different from any predictor candidate in a subset of predictor candidates from the set of predictor candidates and in response adding the current potential predictor candidate to the set of predictor candidates; and encoding the block based on a predictor candidate from set of predictor candidates.

According to another aspect, there is provided a second method. The method comprises receiving, for a block being decoded in a picture, an information for decoding mode; determining, for the block being decoded, a set of predictor candidates, wherein, for at least one current potential predictor candidate in a set of potential predictor candidates, determining the current potential predictor candidate is different from any predictor candidate in a subset of predictor candidates from the set of predictor candidates and in response adding the current potential predictor candidate to the set of predictor candidates; and decoding the block based on the received information and the set of predictor candidates.

According to another aspect, there is provided an apparatus. The apparatus comprises one or more processors, wherein the one or more processors are configured to: determine, for the block being encoded, a set of predictor candidates, wherein for at least one current potential predictor candidate in a set of potential predictor candidates, the current potential predictor candidate is determined as different from any predictor candidate in a subset of predictor candidates from the set of predictor candidates and in response the current potential predictor candidate is added to the set of predictor candidates; and encode the block based on a predictor candidate from the set of predictor candidates.

According to another aspect, there is provided another apparatus. The apparatus comprises one or more processors, wherein the one or more processors are configured to: receive, for a block being decoded in a picture, an information for a decoding mode; determine, for the block being decoded, a set of predictor candidates, wherein for at least one current potential predictor candidate in a set of potential predictor candidates, the current potential predictor candidate is determined as different from any predictor candidate in a subset of predictor candidates from the set of predictor candidates and in response the current potential predictor candidate is added to the set of predictor candidates; and decode the block based on the received information and the set of predictor candidates.

According to another general aspect of at least one embodiment, the set of predictor candidates is ordered, and the subset comprises the last N predictor candidates in the set of predictor candidates, N being an integer between 1 and a maximum number of candidates in the set.

According to another general aspect of at least one embodiment, the order of predictor candidates is based on the distance between successive potential predictor candidates in the set.

According to another general aspect of at least one embodiment, N is set to 2, and the order of predictor candidates is a predictor candidate with a larger distance from a current predictor candidate, followed by a predictor candidate with a smaller distance from a current predictor candidate.

According to another general aspect of at least one embodiment, the set of predictor candidates comprises spatial and temporal predictor candidates and wherein distance between successive predictor candidates comprises a spatial distance and a temporal distance.

According to another general aspect of at least one embodiment, the order of predictor candidates is adaptive to the size of the block.

According to another general aspect of at least one embodiment, the set of predictor candidates is ordered based on a distance between successive potential predictor candidates for determining the set of predictor candidates and, after the determining the set of predictor candidates is re-ordered according to another criteria.

According to another general aspect of at least one embodiment, the set of predictor candidates is used in an Adaptive Motion Vector Prediction mode.

According to another general aspect of at least one embodiment, the set of predictor candidates is used in Merge mode.

According to another general aspect of at least one embodiment, the set of predictor candidates comprises affine predictor candidates.

According to another general aspect of at least one embodiment, there is provided a device comprising an apparatus according to any of the decoding embodiments; and at least one of (i) an antenna configured to receive a signal, the signal including the video block, (ii) a band limiter configured to limit the received signal to a band of frequencies that includes the video block, or (iii) a display configured to display an output representative of the video block.

According to another general aspect of at least one embodiment, there is provided a non-transitory computer readable medium containing data content generated according to any of the described encoding embodiments or variants.

According to another general aspect of at least one embodiment, there is provided a signal comprising video data generated according to any of the described encoding embodiments or variants.

According to another general aspect of at least one embodiment, a bitstream is formatted to include data content generated according to any of the described encoding embodiments or variants.

According to another general aspect of at least one embodiment, there is provided a computer program product comprising instructions which, when the program is executed by a computer, cause the computer to carry out any of the described decoding embodiments or variants.

These and other aspects, features and advantages of the general aspects will become apparent from the following detailed description of exemplary embodiments, which is to be read in connection with the accompanying drawings.

BRIEF DESCRIPTION OF THE DRAWINGS

FIG. 8 shows an exemplary process to create a re-ordered list of candidates according to an embodiment of the present disclosure.

FIG. 9 shows an exemplary measure of a spatial distance between candidates according to an embodiment of the present disclosure.

FIGS. 10, 11, 12 and 13 show others exemplary measures of a spatial distance between candidates and re-ordering according to others embodiments of the present disclosure.

FIG. 16 shows another exemplary measure of a distance between affine models according to another embodiment of the present disclosure.

DETAILED DESCRIPTION

It is to be understood that the figures and descriptions have been simplified to illustrate elements that are relevant for a clear understanding of the present principles, while eliminating, for purposes of clarity, many other elements found in typical encoding and/or decoding devices. It will be understood that, although the terms first and second may be used herein to describe various elements, these elements should not be limited by these terms. These terms are only used to distinguish one element from another.

The various embodiments are described with respect to the encoding/decoding of a picture. They may be applied to encode/decode a part of picture, such as a slice or a tile, or a whole sequence of pictures.

Various methods are described above, and each of the methods comprises one or more steps or actions for achieving the described method. Unless a specific order of steps or actions is required for proper operation of the method, the order and/or use of specific steps and/or actions may be modified or combined.

In the HEVC video compression standard (H.265/HEVC High Efficiency Video Coding, ITU-T H.265 Telecommunication Standardization Sector of ITU, "Series H: Audiovisual and Multimedia Systems, Infrastructure of audiovisual services—Coding of moving video, High efficiency video coding."), motion compensated temporal prediction is employed to exploit the redundancy that exists between successive pictures of a video. To do so, a motion vector is associated to each prediction unit (PU), which is introduced now. Each CTU (Coding Tree Unit) is represented by a Coding Tree in the compressed domain. This is a quad-tree division of the CTU, where each leaf is called a Coding Unit (CU) as illustrated on FIG. 1.

Figure 2:
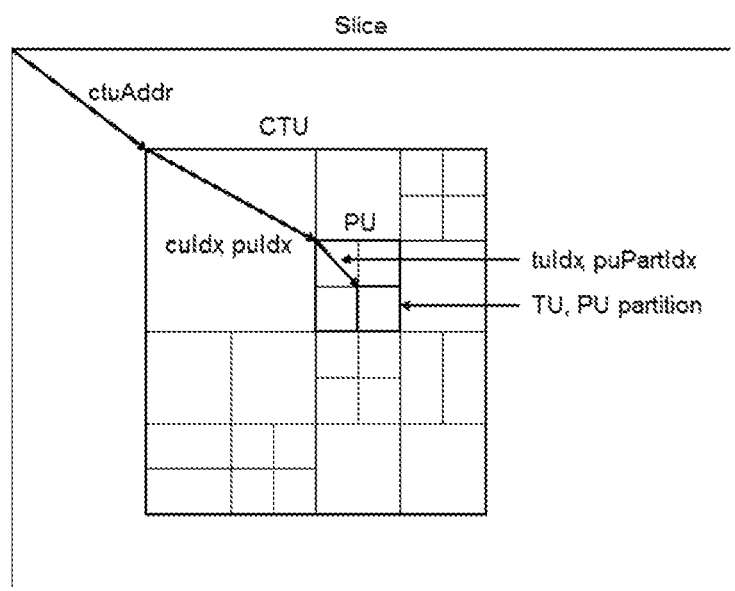
FIG. 2 shows division of a Coding Tree Unit into Coding Units, Prediction Units and Transform Units.
Figure 3:
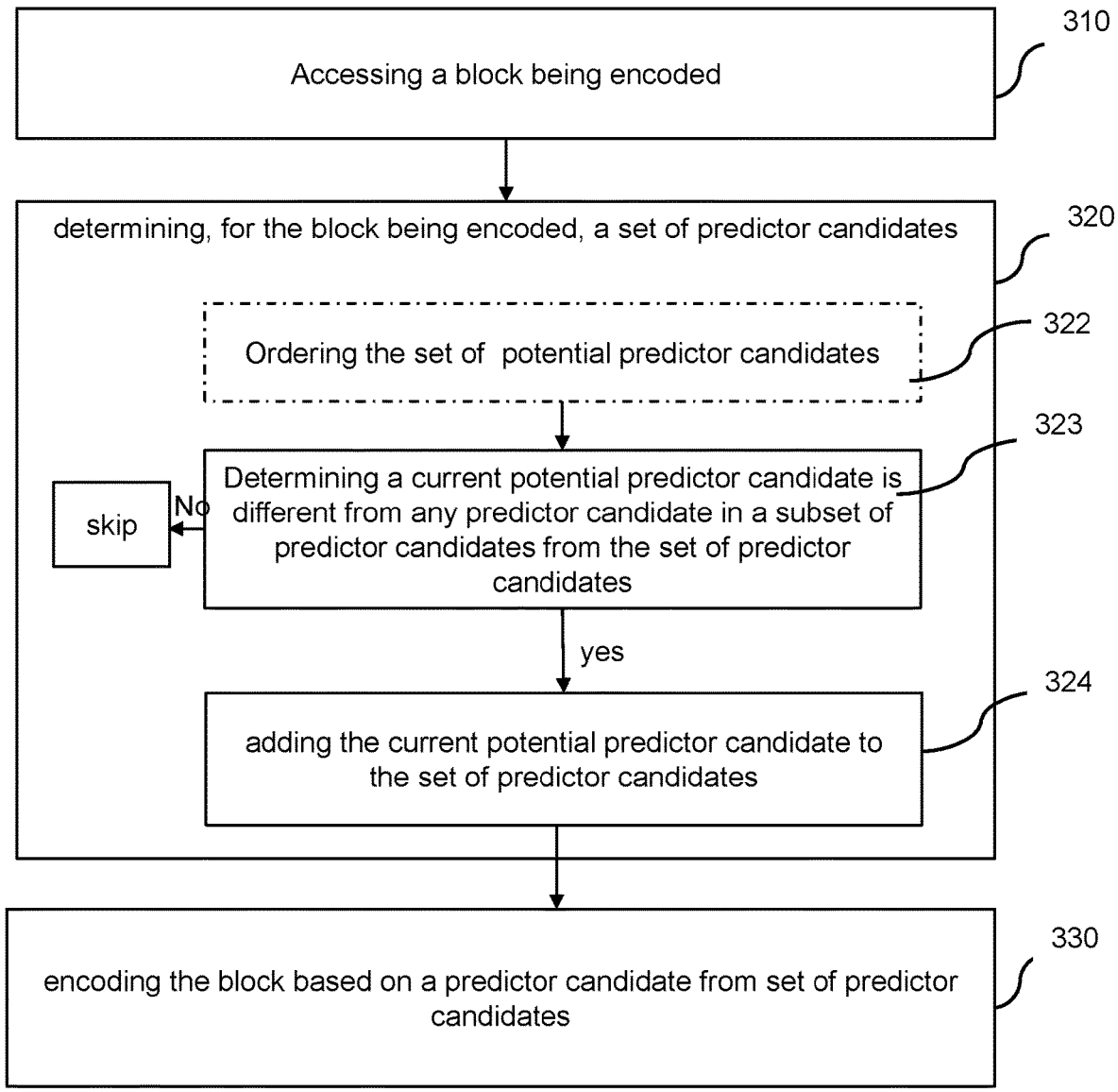
FIG. 3 shows an encoding method according to an embodiment of the present disclosure.
Figure 4:
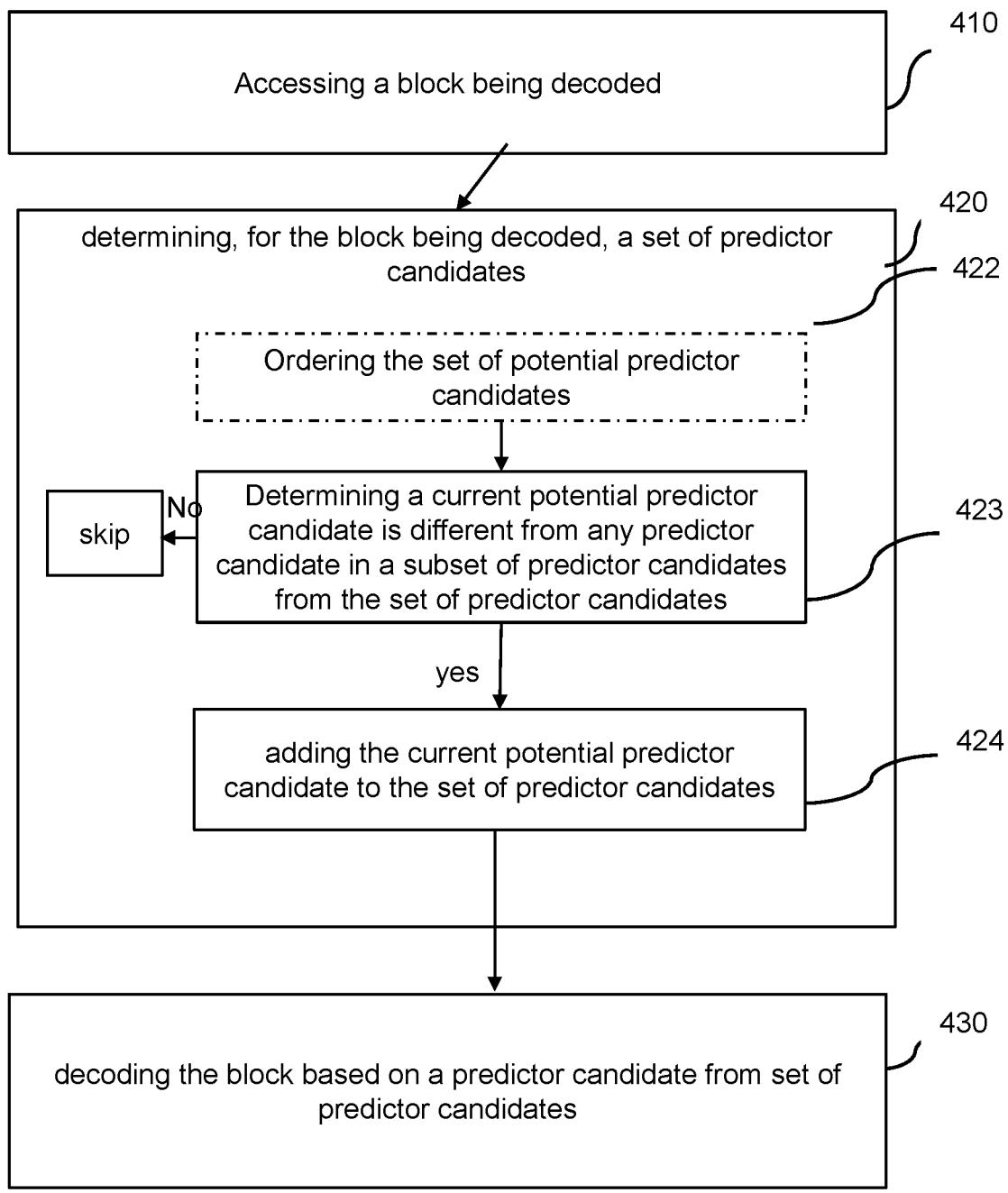
FIG. 4 shows a decoding method according to an embodiment of the present disclosure.

Each CU is then given some Intra or Inter prediction parameters (Prediction Info). To do so, it is spatially partitioned into one or more Prediction Units (PUs), each PU being assigned some prediction information. The Intra or Inter coding mode is assigned on the CU level as shown on FIG. 2.

Figure 1:
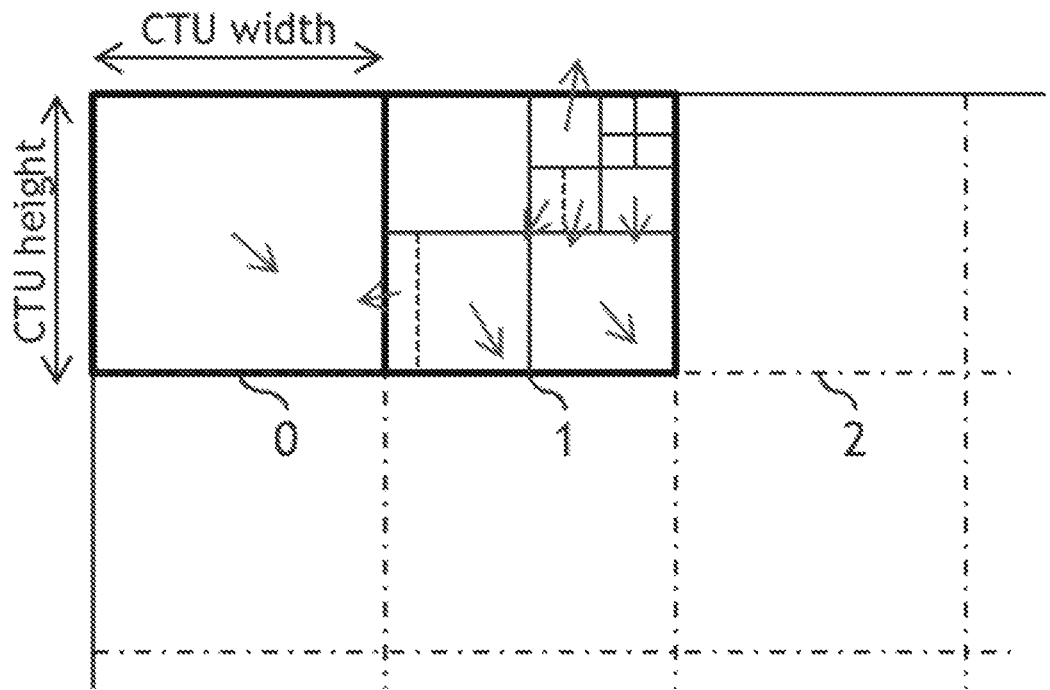
FIG. 1 shows a Coding Tree Unit and Coding Tree concepts to represent a compressed HEVC picture.

Exactly one Motion Vector is assigned to each PU in HEVC (arrows on FIG. 1). This motion vector is used for motion compensated temporal prediction of the considered PU. Therefore, in HEVC, the motion model that links a predicted block and its reference block simply consists in a translation. This is therefore typically referred to as a translation or traditional motion prediction model.

Besides, two modes are employed in HEVC to encode the motion data. They are respectively called AMVP (Adaptive Motion Vector Prediction) and Merge.

AMVP basically consists in signaling the reference picture(s) used to predict current PU, the Motion Vector Predictor index (taken among a list of 2 predictors) and a motion vector difference.

The merge mode comprises signaling and decoding the index of some motion data collected in a list of motion data predictors. The list is made of 5 candidates and is constructed the same way on the decoder and the on encode sides. Therefore, the merge mode aims at deriving some motion information taken from the merge list. The merge list typically contains the motion information associated to some spatial and temporal surrounding blocks, available in their decoded state when the current PU is being processed.

In the Joint Exploration Model (JEM) and later VTM (Versatile Video Coding (VVC) Test Model) developed by the JVET (Joint Video Exploration Team) group, some richer motion models are supported to improve temporal prediction. To do so, a PU can be spatially divided into sub-PU and a richer model can be used to assign each sub-PU a dedicated motion vector. One of the new motion models introduced in the JEM is the affine model, which basically consists in using an affine model to represent the motion vectors in a CU. For both of the modes AMVP and Merge, a PU in VVC can be either translational or affine.

The present principles are advantageously related with any mode which generate a list of motion data predictor candidates and will be discussed in the following of the present application. In all cases, the construction of a list of candidates is required. The maximum size of the list M is given (but the maximum number of candidates can be different for each mode being merge, merge affine etc.). The maximum number of candidates to push in the list is P. At encoder, an index is transmitted to the decoder to signal the predictor (ie motion vector) to use as a predictor for the decoding.

Methods for improving the compression efficient proposes increasing the number of potential candidates to add to the list for motion prediction. However, it is desirable to avoid redundancy in the candidates' list. Therefore, an additional verification is done before adding the potential candidate to the list to check whether this candidate is already present or not. Thus, increasing the number of candidates in the list complexifies the design of the decoder/encoder. Indeed, in prior art approaches, the list creation comprises looping on all potential candidates in a fixed order and put it in the list if it passes some criteria. In order to improve the compression performance, a criterion to filter the potential candidates is to check if it is already in the list (pruning based on unicity). It increases the list creation complexity because it requires to compare a given candidate to all candidates already in the list. The worst case complexity of comparisons is given by $C=(M-1)(M-2)/2+(M-1)(P-N+1)$ where the integers M and P are defined above and N is the number of given candidates to add to the candidates already in the list.

A solution for limiting the comparisons complexity is to skip the unicity pruning. However, such solution decreases the compression performance since the list can be filled with identical candidates.

An encoding/decoding method that generates candidates list (for either merge, merge affine, AMVP, AMVP affine) which is both efficient in term of compression efficiency, by proposing a lot of potential candidates, and efficient in term of complexity, by limiting the computation in the creation of the list, is therefore desirable.

At least one embodiment of the present principles relates to an encoding/decoding method comprising:

Limiting the unicity pruning by comparing the current candidate to the N last candidates in the list (with $0<N<M$), whatever the candidates. In other words, a number of comparisons, i.e. comparisons with the M-N first candidates, in the list are discarded. The compleAty becomes $C=(M-N)*P+(N-1)N/2$;

Ordering the list creation such as the above criteria is mitigated and does not impact the compression performance.

Several embodiments are described that

Limit the comparisons for pruning to part of the list, instead of all elements in the list;

More specifically limit to the N last elements;

Reorder the list creation dynamically to put likely similar candidates close together in the list;

More specifically, put close in the list the candidates which are spatially close;

More specifically, take in to account the block size to select the spatially close candidate;

More specifically, for affine candidates, take into account the corners location to determine close candidates.

Generic Embodiment of an Encoding Method

According to at least one aspect of the present disclosure, a method for coding a video is disclosed. Such a method comprises accessing 310 a block being encoded. For inter-coding, a set of predictor candidates is determined at step 320 for the block being encoded. According to at least one generic embodiment, at least one current potential predictor candidate in a set of potential predictor candidates is tested to determine at sub-step 323 whether the current potential predictor candidate is different from any predictor candidate in a subset of predictor candidates from the set of predictor candidates. In case (Yes) the current potential predictor candidate is different from the candidates in the subset, the current potential predictor candidate is added to the set of predictor candidates. And if any, another current potential predictor candidate in the set of potential predictor candidates is tested. In case (No) the current potential predictor candidate is skipped and if any, another current potential predictor candidate in the set of potential predictor candidates is tested. Once the set (or list) of predictor candidates is created, the block is encoded at 330 based on a predictor candidate from set of predictor candidates as described for instance for merge mode, affine merge mode, AMVP or affine AMVP.

According to a particular feature, discussed in with the exemplary second embodiment, the set of potential predictor candidates is ordered 322 and the order of predictor candidates is based on a distance between successive potential predictor candidates in the set of potential predictor candidates. Therefore, the set of predictor candidates is ordered accordingly since potential candidates are added one after the other in the set of predictors candidates after pruning. Advantageously, different variants of distances are used: Euclidian distance, Manhattan distance, chessboard distance.

Generic Embodiment of a Decoding Method

According to at least one aspect of the present disclosure, a method for decoding a video is disclosed. Such a method comprises accessing 410 a block being decoded and receiving for the block being decoded, information for decoding mode. For inter-decoding, a set of predictor candidates is determined at step 420 for the current block as done for the encoding method to obtain the same set of predictors candidates. According to at least one generic embodiment, at least one current potential predictor candidate in a set of potential predictor candidates is tested to determine at sub-step 423 whether the current potential predictor candidate is different from any predictor candidate in a subset of predictor candidates from the set of predictor candidates. Then, at 424 the current potential predictor candidate is added to the set of predictor candidates in case the current potential predictor candidate is different from any predictor candidate in a subset of predictor candidates from the set of predictor candidates or the current potential predictor candidate is skipped in case it is not already in the subset. At 430 the block is decoded based on the received information and the set of predictor candidates.

According to a particular feature, discussed with the second exemplary embodiment, the set of potential predictor candidates and accordingly the set of predictor candidates are ordered in 422. The order of predictor candidates is based on the distance between successive potential predictor candidates in the set of potential predictor candidates.

An Embodiment of List Creation for Merge Mode

The principles of creation of a list (or set) of predictor candidates for merge mode in HEVC are described in this section as an exemplary embodiment wherein the present principles could be applied. The same principles apply to affine merge or AMVP list creation.

In the HEVC standard, the merge mode comprises deriving the inter prediction information (also called motion information in the following) of a given prediction unit PU (also called block in the application) from a selected motion information predictor candidate. The motion information considered here includes the all the inter prediction parameters of a PU, that is to say:

The uni-directional or bi-directional temporal prediction type

The reference picture index within each reference picture list

The motion vector(s)

Figure 5:
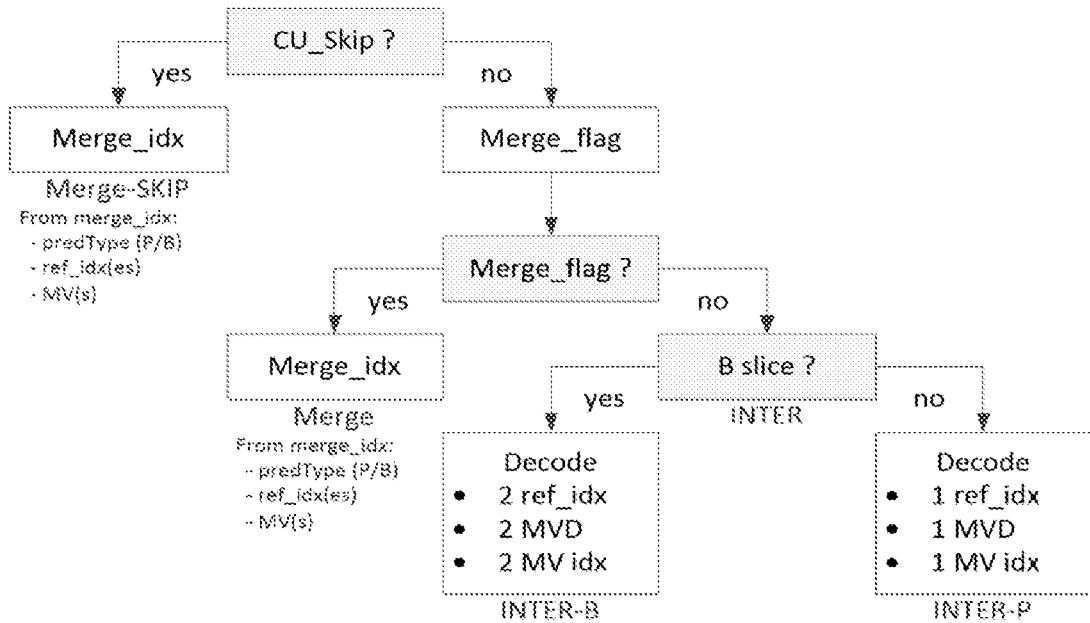
FIG. 5 illustrates a signaling of the inter prediction information according to the HEVC specification.

The coding and decoding of inter prediction information in HEVC is summarized on FIG. 5. As can be seen, the motion information coding/decoding according to the merge mode takes please in two modes: the skip mode and the merge mode. In these two modes, one single field is being signaled to make the decoder able to retrieve the motion information of a PU: the so-called merge index. The merge index indicates which Motion Vector predictor in the list of merge motion information predictor is used to derive the motion information of current PU. In the following, the list of motion information predictors is called the merge list, or merge candidate list. Moreover, a candidate motion information predictor is called a merge candidate. In the following the term "predictor candidate" is also used as a generic name for merge candidate independently from the motion prediction mode.

Figures 6A, 6B:
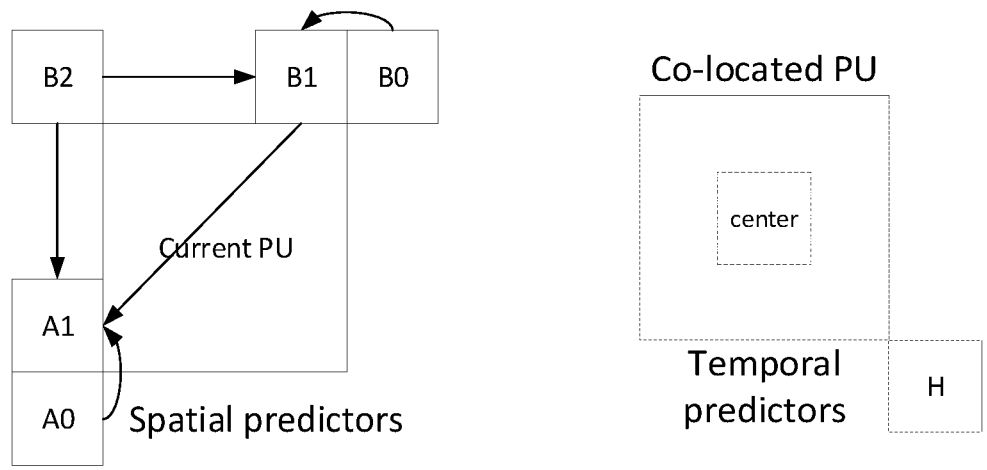
FIG. 6a illustrates positions of spatial and temporal motion vector predictors used in the merge mode in HEVC.
FIG. 6b illustrates positions of temporal motion vector predictors used in the merge mode in HEVC

In HEVC the merge candidate list is systematically made of 5 merge candidates. The following of this section describes how the merge list is constructed, both on the encoder and on the decoder sides. As can be seen, up to 5 spatial positions are considered to retrieve some potential candidates. They are visited according to the following order, called the order of set of potential predictor candidates:

1—Left (A1)
2—Above (B1)
3—Above right (B0)
4—Left bottom (A0)
5—Above left (B2)
6—Temporal H
7—Temporal Center C
8—Combined
9—Zeros Where the symbols A0, A1, B0, B1, B2 denote the spatial position shown on FIG. 6. 5 spatial candidates which are different from each other are selected. Then a temporal predictor noted TMVP is selected, the temporal motion information located at position H is firstly considered, and then "center" if candidate at position H is not available. A last pruning process then takes place to ensure the selected set of spatial and temporal candidates does not contain redundant candidate.

Next, in the case of a B slice, candidates of another type are pushed to the merge list if it is not full: the so-called combined candidates. This consists in forming a candidate made of the motion information associated to one reference picture list (L0) from one candidate already present in the list, with the motion associated to the other reference picture list (L1) from another candidate already present in the merge list.

Finally, if the merge list is still not full (5 elements) then zero motion vectors are pushed to the back of the merge list until it is full.

A First Embodiment of List Creation with Partial List Comparison in an Encoding/Decoding Method According to at least an embodiment, a potential predictor candidate is added to the set of predictor candidates in case such potential predictor candidate is different from any predictor candidate in a subset of predictor candidates from the set of predictor candidates. The subset is distinct from the set of predictor candidates. Advantageously, the embodiment performs a partial list comparison, thus reducing complexity. According to a non-limiting example used for better understanding of the reader, the subset comprises the last N predictor candidates in the set of predictor candidates, N being an integer between 1 and a maximum number of candidates in the set.

Figure 7:
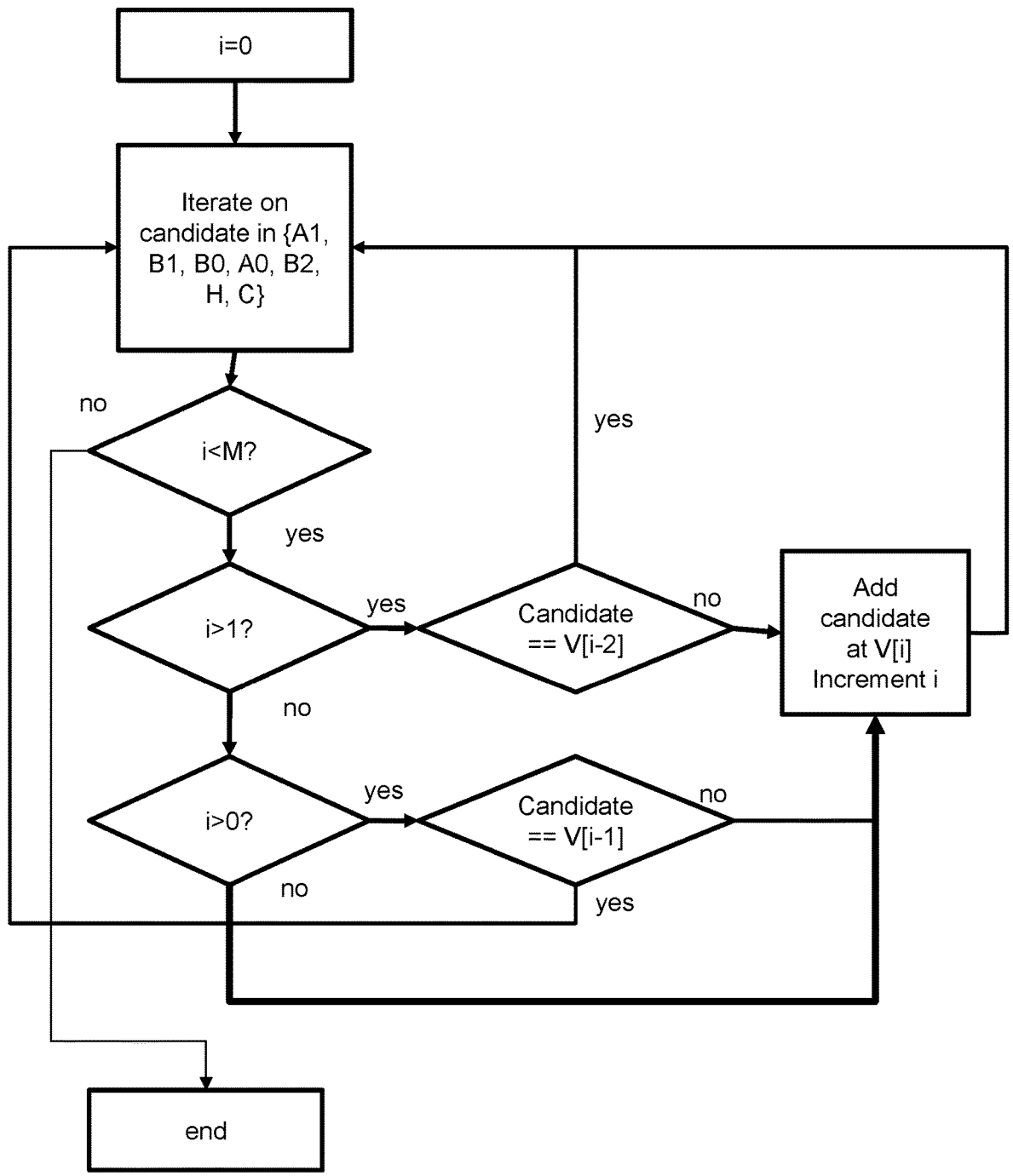
FIG. 7 illustrates a method for creating a list of candidates with partial list comparison with N=2 according to an embodiment of the present disclosure.

In other words, instead of pruning all candidates, when adding a candidate to the list, we compare it to the last N=2 candidates in the list. FIG. 7 illustrates a method for determining a list of candidates with partial list comparison with N=2 according to an embodiment of the present disclosure. M is the maximum size of the list, P is the maximum number of candidates to push in the list and N the size of the subset to test for pruning. The variable i identifying the candidates added in the list V is initialized to zero. Then the first potential candidate A1 in the set of P potential predictor candidates comprising {A1, B1, B0, A0, B2, H, C} is added to list at position 0 since the list is empty (i<M, V[i−1] and V[i−2] do not exist, no test). The variable i is incremented to one. Then the second potential candidate B1 is tested. If B1=V[i−1]=A0, then the second potential candidate is not added to the list, and the third potential candidate is tested. If B1≠V[i−1]=A0, then the second potential candidate is added to the list, I is increment to 2 and the third potential candidate is now tested. The process is iterated for each potential candidate in the list {A1, B1, B0, A0, B2, H, C} until the maximum number M of candidates in the list V is reached. According to a non-limiting example illustrated on FIG. 7, N=2 when M=5. Alternatively, according to another non-limiting example for M=8 and P=20, N=3. Note that the comparison to the N last candidates in the list is always done, whatever the candidates in the list in order to simplify the list construction process.

A Second Embodiment of List Creation Comprising Ordering the List of Candidates in an Encoding/Decoding Method In order to improve efficiency and pruning the maximum of identical candidates, we propose to use the above process together with a re-ordering of the list of potential predictor candidates. Accordingly, the list ordering is different from the previously proposed list ordering for HEVC merge mode ({A1, B1, B0, A0, B2, H, C}).

The list uses an order to respect the following constraints:
(C0) Put likely different candidates as soon as possible in the list in order to propose a maximum of candidates' diversity with a low index coding cost (the lower the index, the lower the coding cost)
(C1) Put likely similar candidates apart from at most N as much as possible, in order to be able to eliminate likely duplicate: if the distance is less or equal to N, identical candidates will be removed, giving more space to put other potential candidates.

For example, for a set of 5 potential candidates, starting at A1, we get the following order illustrated on FIG. 8 by dash points: {A1, B0, A0, B1, B2}. In FIG. 9, we show the corresponding spatial distance between candidates. Advantageously, the Manhattan distance is used wherein the Manhattan distance is the sum of distance along X and distance along Y (namely sum of vertical and horizontal distances).

By starting at A1, for N=2, the algorithm is as follow:
Add A1. Current List is now {A1}.
Take the further away from A1: B0. Current List is now {A1, B0}
Take the further away from candidates in current list AND close to A1 (ie 2 index before in the list): A0. Current List is now {A1, B0, A0}
Take the further away from candidates in current list AND close to B0 (ie 2 index before in the list): A1. Current List is now {A1, B0, A0, B1}
Take the further away from candidates in current list AND close to B0 (ie 2 index before in the list): B2. Current List is now {A1, B0, A0, B1, B2}
We see that for N=2, it respects (C0) and (C1).

A Third Embodiment of List Creation Comprising Dynamic Ordering of the List of Candidates Depending on the Size of the Block being Encoded/Decoded According to yet another embodiment, the list ordering is dynamic and depends on the size of the block. Advantageously, this embodiment allows to improve distance-based order, as the embodiment dynamically considers the spatial distances between candidates.

A first variant of the third embodiment adapted to a fat block is illustrated on FIG. 10. For example, for a set of 5 potential candidates, for a fat block (larger than high), the distance between candidates is illustrated on the right part of FIG. 10.

Starting at B2, we get the following order
Add B2. List is now {B2}.
Take the further away from B2: B0. Current List is now {B2, B0}
Take the further away from candidates in current list AND close to B2 (ie 2 index before in the list): A1. Current List is now {B2, B0, A1}
Take the further away from candidates in current list AND close to B0 (ie 2 index before in the list): A1. Current List is now {B2, B0, A1, B1}
Take the further away from candidates in current list AND close to A1 (ie 2 index before in the list): A0. Current List is now {B2, B0, A1, B1, A0}

Figure 11:
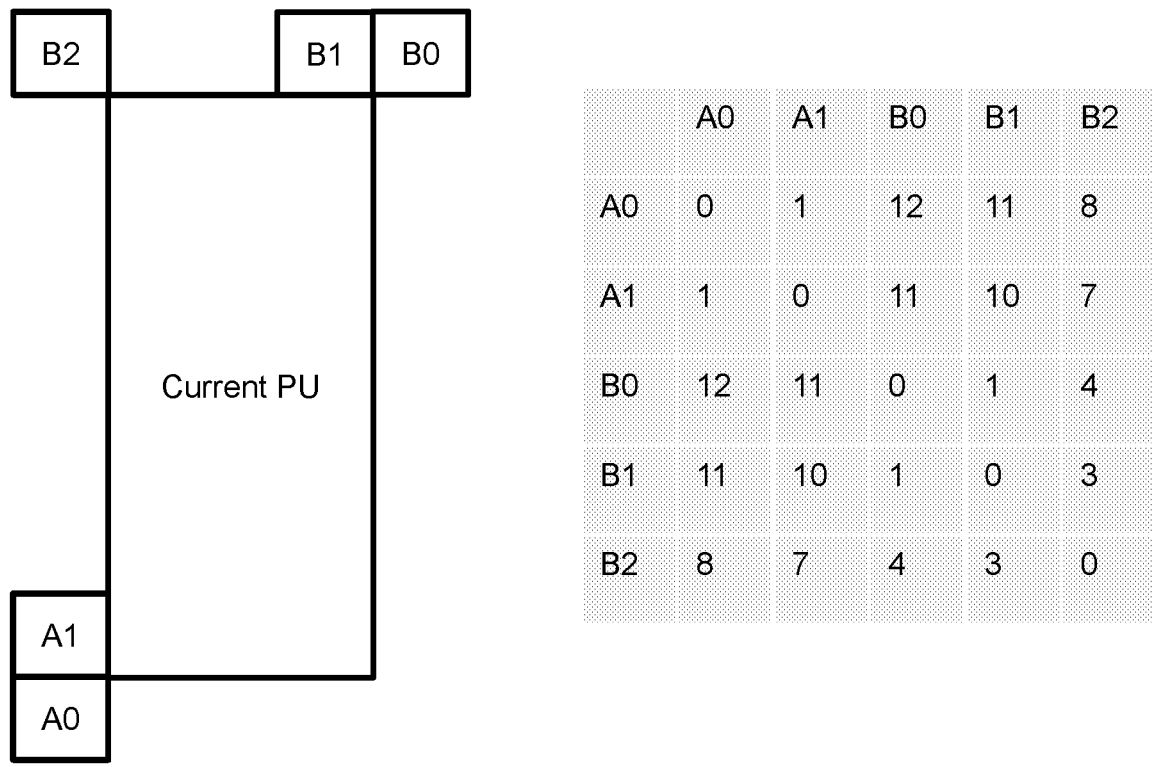

A second variant of the third embodiment adapted to a thin block is illustrated on FIG. 11. Starting at B2, we get the following order
Add B2. List is now {B2}.
Take the further away from B2: A0. Current List is now {B2, A0}
Take the further away from candidates in current list AND close to B2 (ie 2 index before in the list): B1. Current List is now {B2, A0, B1}
Take the further away from candidates in current list AND close to A0 (ie 2 index before in the list): A1. Current List is now {B2, A0, B1, A1}
Take the further away from candidates in current list AND close to B1 (ie 2 index before in the list): B0. Current List is now {B2, A0, B1, A, B0}

Advantageously, the order is determined for each block size in advance.

Figure 12:
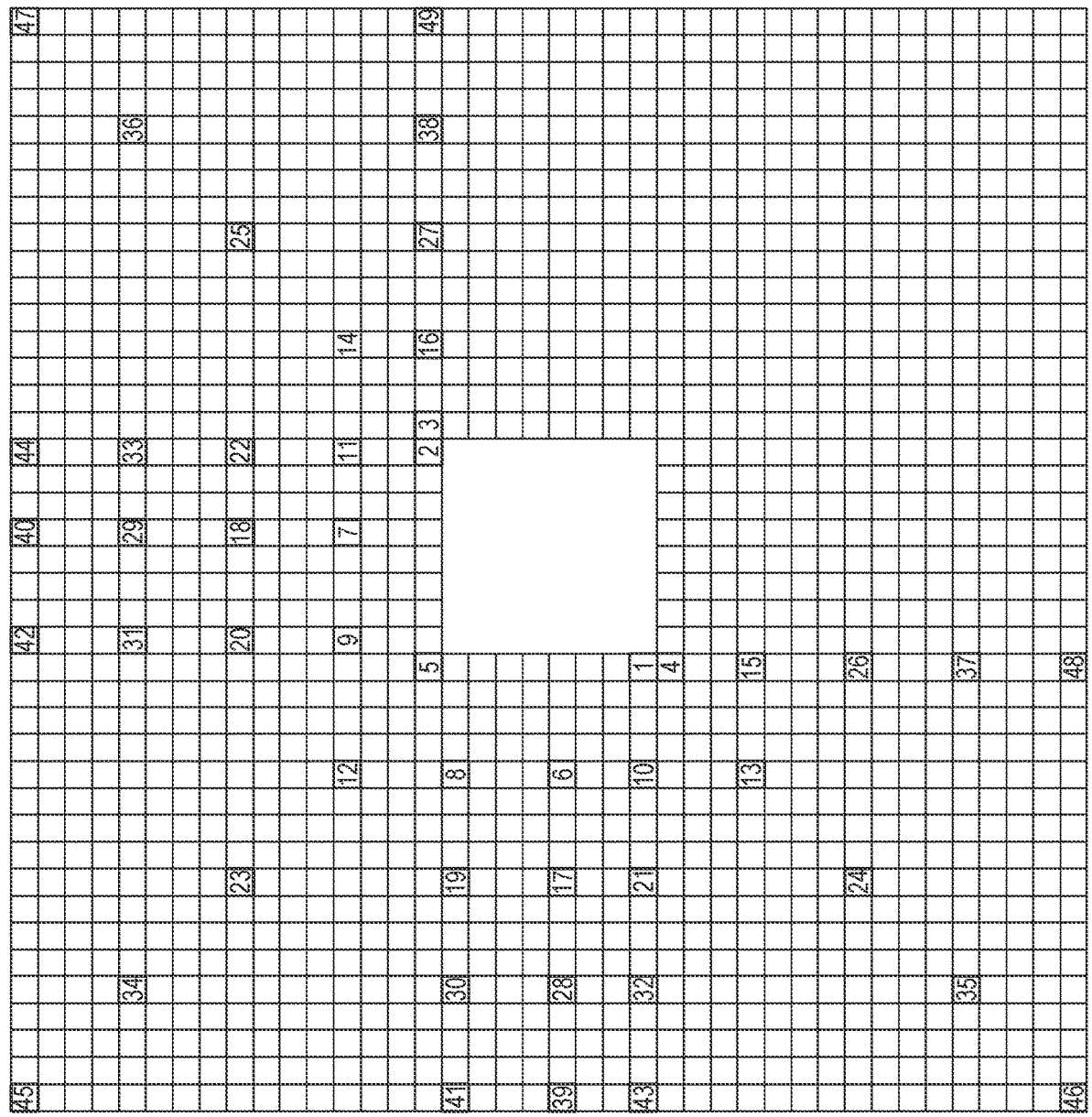

A third variant of the third embodiment adapted to non-adjacent candidate is illustrated on FIG. 12. In the latest development of new coding standards such as Versatile Video Coding, non-adjacent to the current block candidates are also proposed as shown on FIG. 12. The present principles are advantageously easily adapted by applying the same process as above in computing the distance and an optimal order is also computed.

Figure 13:
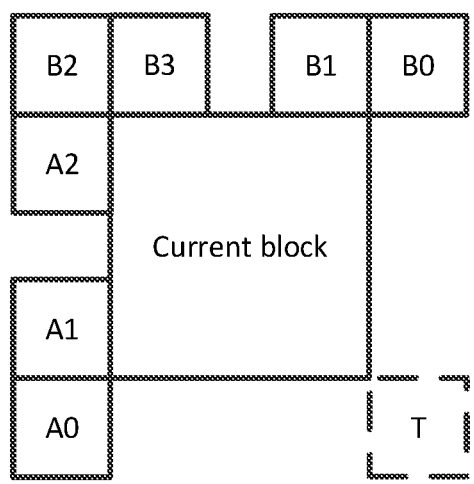

A fourth variant of the third embodiment adapted to temporal candidates is further illustrated on FIG. 13. As the temporal candidates are taken in other reference frame (see candidate T FIG. 13), the distance between a spatial and a temporal candidate can be arbitrarily offset. For example, in FIG. 13, if distance between B2 and B0 is d, then the distance between A0 and T is set to d+k, with k large enough (for example k=2*d or depending on the POC distance). The distance between temporal candidates themselves can be calculated as for the spatial candidates if they originated from the same reference picture.

According to yet another variant of the third embodiment, as for the temporal candidate distance adaptation, an arbitrary offset can be set between candidates if they do not share the same reference picture index for the motion vector.

A Fourth Embodiment of List Creation Comprising Dynamic Ordering of the List of Candidates for Affine Candidates in an Encoding/Decoding Method In the latest development of new coding standards such as Versatile Video Coding, affine constructed candidates for merge mode are considered. For affine constructed candidates, the distances between corners become important. A constructed affine model is computed by using 2 or more candidate vectors, usually at the corner of a PU.

Figure 14:
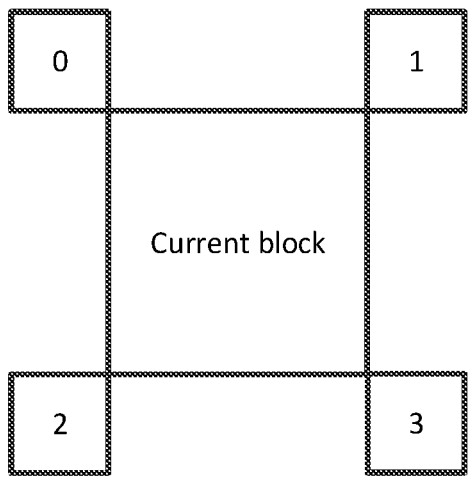
FIG. 14 illustrates the numbering used for affine corners according to another embodiment of the present disclosure.

In order to improve this order, we propose to take into account the corners used to build the model. For example, the merge affine process adds the following constructed affine candidates wherein the numbering of used for affine candidates is illustrated on FIG. 14:

{0, 1, 2}, //1: LT, RT, LB
{0, 1, 3}, //2: LT, RT, RB
{0, 2, 3}, //3: LT, LB, RB
{1, 2, 3}, //4: RT, LB, RB
{0, 1}, //5: LT, RT
{0, 2}, //6: LT, LB
{1, 2}, //7: RT, LB
{0, 3}, //8: LT, RB
{1, 3}, //9: RT, RB
{2, 3}, //10: LB, RB

In the case of a constructed model, the distance between models is obtained by considering the distances between the corners used to construct the model.

Figure 15:
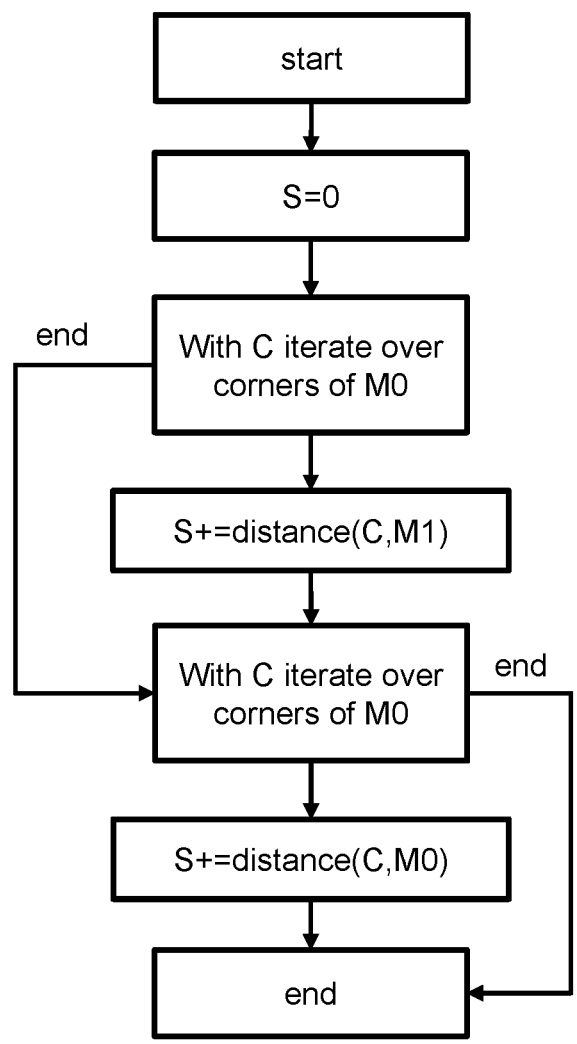
FIG. 15 shows an exemplary process to compute distance between affine models for a re-ordered list of candidates according to an embodiment of the present disclosure.

In FIG. 15, the process to compute the distance between 2 models M0 and M1 is illustrated. The distance S between each corner C of M0 and the model M1 is accumulated, and reciprocally S between each corner C of M1 and the model M0 is accumulated. According to a particular variant, the distance between a corner C and a model M is a distance smaller than the distance between the corner C and any corner of the model M.

For example, the distance between the model M0 {0, 1, 2} and M1 {0, 1, 3} is given by the sum of these distances:
S=0
Distance between 0 and the closest corners in {0, 1, 3}. S+=0
Distance between 1 and the closest corners in {0, 1, 3}. S+=0
Distance between 2 and the closest corners in {0, 1, 3}. S+=distance(2, 3)
Distance between 0 and the closest corner in {0, 1, 2}. S+=0
Distance between 1 and the closest corner in {0, 1, 2}. S+=0
Distance between 3 and the closest corner in {0, 1, 2}. S+=distance(2, 3)

The final distance is then S=2*distance(2, 3).

Assuming a distance of 1 between corner 0 and 1, and a distance of 2 between corners 2 and 1, the table for the distance between models is obtained as described above. As the corner 3 is a temporal candidate, its distance is set as: distance(2, 3)=distance(1, 3)=3, distance(0, 3)=4. Using the same process as before, an optimal order is found to sort the affine model candidates. In yet another variant, the same dynamic process is also applied to take into account the block size (for fat or thin blocks).

A Fifth Embodiment of List Creation Comprising with Fixed Ordering of the List of Candidates in an Encoding/Decoding Method In all above cases, both lists (potential candidates before pruning and pruned candidates) order are fixed and re-ordered according to a distance criteria. In a fifth embodiment, only the pruning process will follow the optimal list re-ordering according to distance, the determined predictor candidates list follows the original creation order. In other word, the determined candidate list is re-ordered after the determining/pruning so that the output candidate list order is not modified compared to the original list. In such case, the candidate index coding is the same and the number of comparisons is kept low.

Additional Embodiments and Information

This application describes a variety of aspects, including tools, features, embodiments, models, approaches, etc. Many of these aspects are described with specificity and, at least to show the individual characteristics, are often described in a manner that may sound limiting. However, this is for purposes of clarity in description, and does not limit the application or scope of those aspects. Indeed, all of the different aspects can be combined and interchanged to provide further aspects. Moreover, the aspects can be combined and interchanged with aspects described in earlier filings as well.

Figure 17:
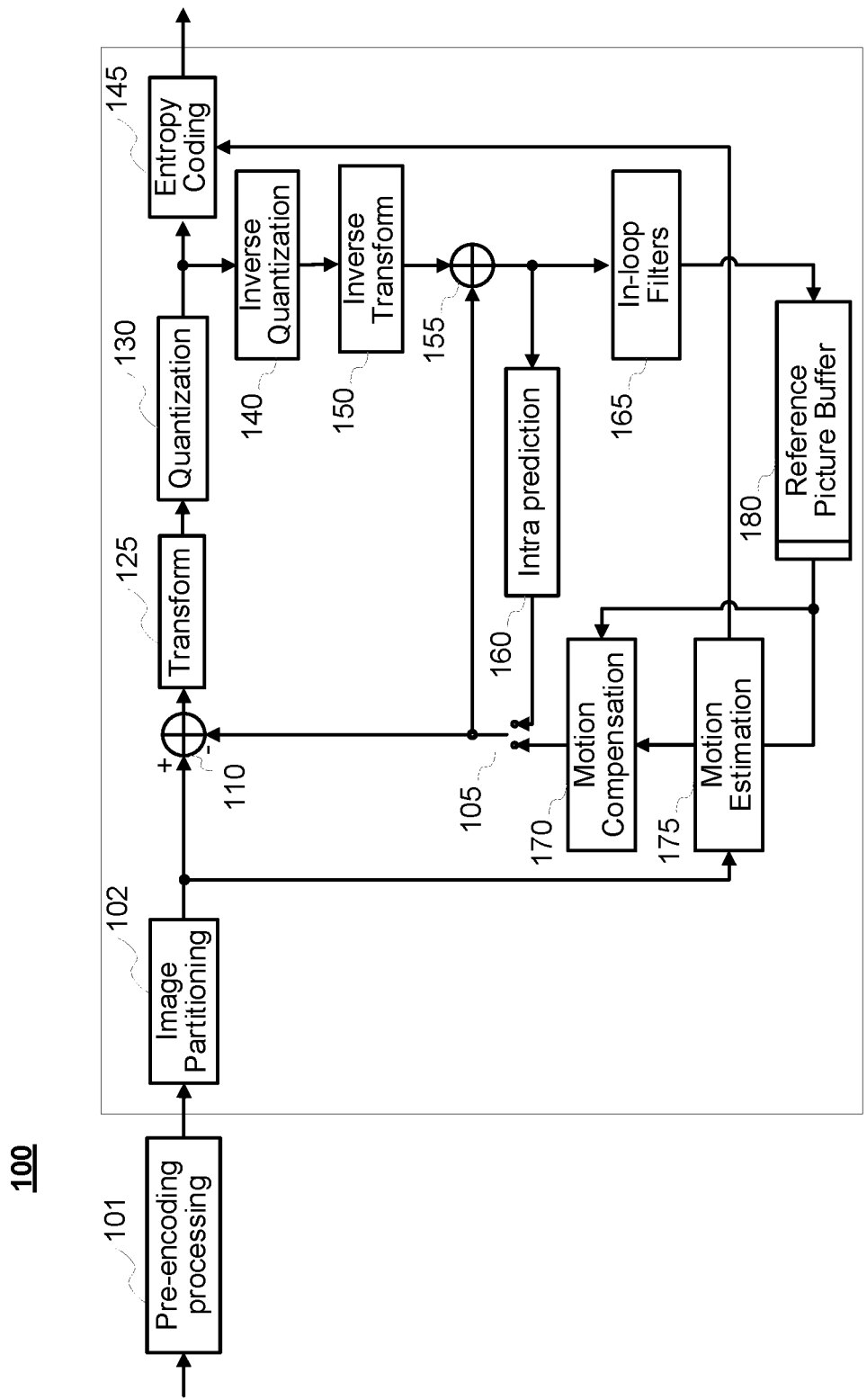
FIG. 17 shows a block diagram of an embodiment of a video encoder.
Figure 18:
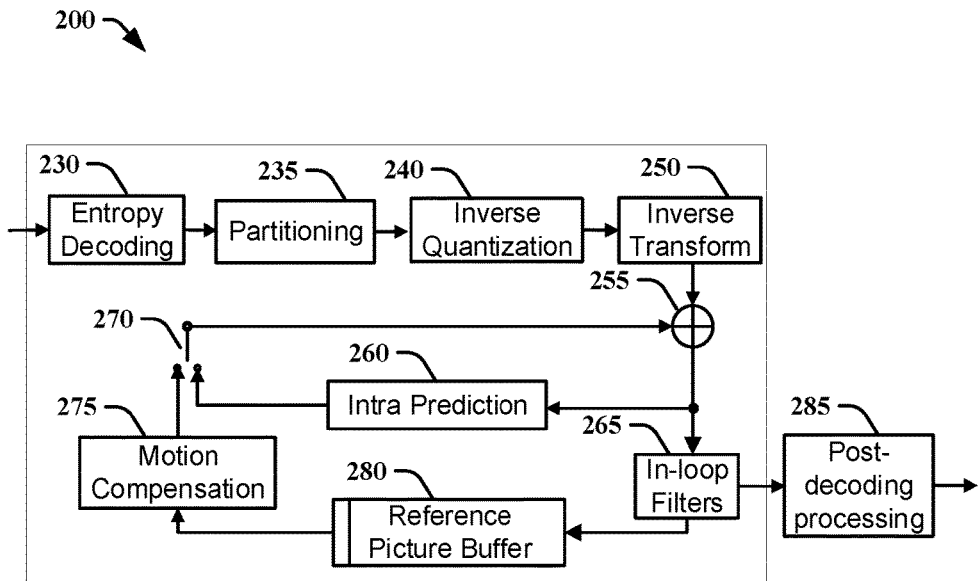
FIG. 18 shows a block diagram of an embodiment of a video decoder.
Figure 19:
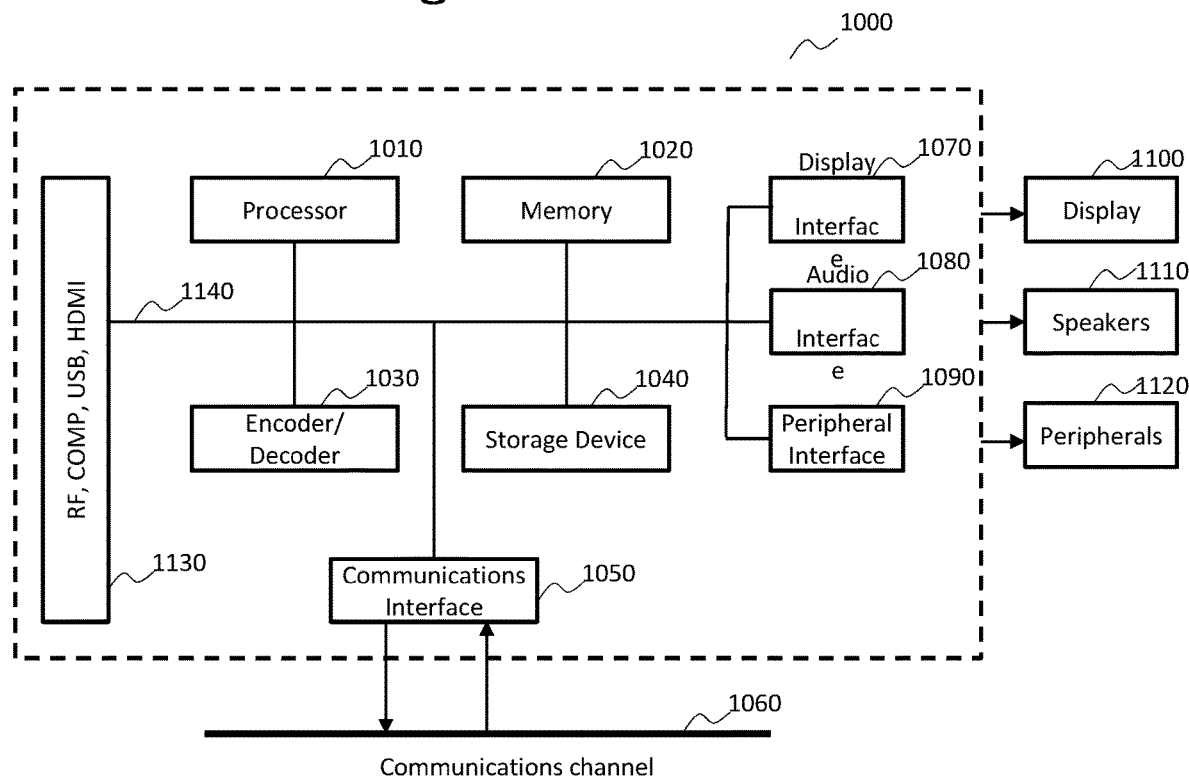
FIG. 19 shows a block diagram of a system within which aspects of the present embodiments may be implemented.

The aspects described and contemplated in this application can be implemented in many different forms. FIGS. 17, 18 and 19 below provide some embodiments, but other embodiments are contemplated and the discussion of FIGS. 17, 18 and 19 does not limit the breadth of the implementations. At least one of the aspects generally relates to video encoding and decoding, and at least one other aspect generally relates to transmitting a bitstream generated or encoded. These and other aspects can be implemented as a method, an apparatus, a computer readable storage medium having stored thereon instructions for encoding or decoding video data according to any of the methods described, and/or a computer readable storage medium having stored thereon a bitstream generated according to any of the methods described.

In the present application, the terms "reconstructed" and "decoded" may be used interchangeably, the terms "pixel" and "sample" may be used interchangeably, the terms "image," "picture" and "frame" may be used interchangeably. Usually, but not necessarily, the term "reconstructed" is used at the encoder side while "decoded" is used at the decoder side.

Various methods are described herein, and each of the methods comprises one or more steps or actions for achieving the described method. Unless a specific order of steps or actions is required for proper operation of the method, the order and/or use of specific steps and/or actions may be modified or combined.

Various methods and other aspects described in this application can be used to modify modules, for example, the motion estimation module (175) and the motion compensation module (170, 275), of a video encoder 100 and decoder 200 as shown in FIG. 17 and FIG. 18. Moreover, the present aspects are not limited to WC or HEVC, and can be applied, for example, to other standards and recommendations, whether pre-existing or future-developed, and extensions of any such standards and recommendations (including WC and HEVC). Unless indicated otherwise, or technically precluded, the aspects described in this application can be used individually or in combination.

Various numeric values are used in the present application, for example, the number N of predictor candidates in the subset used in the unicity pruning. The specific values are for example purposes and the aspects described are not limited to these specific values.

FIG. 17 illustrates an encoder 100. Variations of this encoder 100 are contemplated, but the encoder 100 is described below for purposes of clarity without describing all expected variations.

Before being encoded, the video sequence may go through pre-encoding processing (101), for example, applying a color transform to the input color picture (e.g., conversion from RGB 4:4:4 to YCbCr 4:2:0), or performing a remapping of the input picture components in order to get a signal distribution more resilient to compression (for instance using a histogram equalization of one of the color components). Metadata can be associated with the pre-processing, and attached to the bitstream.

In the encoder 100, a picture is encoded by the encoder elements as described below. The picture to be encoded is partitioned (102) and processed in units of, for example, CUs. Each unit is encoded using, for example, either an intra or inter mode. When a unit is encoded in an intra mode, it performs intra prediction (160). In an inter mode, motion estimation (175) and compensation (170) are performed. The encoder decides (105) which one of the intra mode or inter mode to use for encoding the unit, and indicates the intra/inter decision by, for example, a prediction mode flag. Prediction residuals are calculated, for example, by subtracting (110) the predicted block from the original image block.

The prediction residuals are then transformed (125) and quantized (130). The quantized transform coefficients, as well as motion vectors and other syntax elements, are entropy coded (145) to output a bitstream. The encoder can skip the transform and apply quantization directly to the non-transformed residual signal. The encoder can bypass both transform and quantization, i.e., the residual is coded directly without the application of the transform or quantization processes.

The encoder decodes an encoded block to provide a reference for further predictions. The quantized transform coefficients are de-quantized (140) and inverse transformed (150) to decode prediction residuals. Combining (155) the decoded prediction residuals and the predicted block, an image block is reconstructed. In-loop filters (165) are applied to the reconstructed picture to perform, for example, deblocking/SAO (Sample Adaptive Offset) filtering to reduce encoding artifacts. The filtered image is stored at a reference picture buffer (180).

FIG. 18 illustrates a block diagram of a video decoder 200. In the decoder 200, a bitstream is decoded by the decoder elements as described below. Video decoder 200 generally performs a decoding pass reciprocal to the encoding pass as described in FIG. 18. The encoder 100 also generally performs video decoding as part of encoding video data.

In particular, the input of the decoder includes a video bitstream, which can be generated by video encoder 100. The bitstream is first entropy decoded (230) to obtain transform coefficients, motion vectors, and other coded information. The picture partition information indicates how the picture is partitioned. The decoder may therefore divide (235) the picture according to the decoded picture partitioning information. The transform coefficients are de-quantized (240) and inverse transformed (250) to decode the prediction residuals. Combining (255) the decoded prediction residuals and the predicted block, an image block is reconstructed. The predicted block can be obtained (270) from intra prediction (260) or motion-compensated prediction (i.e., inter prediction) (275). In-loop filters (265) are applied to the reconstructed image. The filtered image is stored at a reference picture buffer (280).

The decoded picture can further go through post-decoding processing (285), for example, an inverse color transform (e.g. conversion from YCbCr 4:2:0 to RGB 4:4:4) or an inverse remapping performing the inverse of the remapping process performed in the pre-encoding processing (101). The post-decoding processing can use metadata derived in the pre-encoding processing and signaled in the bitstream.

FIG. 19 illustrates a block diagram of an example of a system in which various aspects and embodiments are implemented. System 1000 can be embodied as a device including the various components described below and is configured to perform one or more of the aspects described in this document Examples of such devices, include, but are not limited to, various electronic devices such as personal computers, laptop computers, smartphones, tablet computers, digital multimedia set top boxes, digital television receivers, personal video recording systems, connected home appliances, and servers. Elements of system 1000, singly or in combination, can be embodied in a single integrated circuit (IC), multiple ICs, and/or discrete components. For example, in at least one embodiment, the processing and encoder/decoder elements of system 1000 are distributed across multiple ICs and/or discrete components. In various embodiments, the system 1000 is communicatively coupled to one or more other systems, or other electronic devices, via, for example, a communications bus or through dedicated input and/or output ports. In various embodiments, the system 1000 is configured to implement one or more of the aspects described in this document.

The system 1000 includes at least one processor 1010 configured to execute instructions loaded therein for implementing, for example, the various aspects described in this document. Processor 1010 can include embedded memory, input output interface, and various other circuitries as known in the art. The system 1000 includes at least one memory 1020 (e.g., a volatile memory device, and/or a non-volatile memory device). System 1000 includes a storage device 1040, which can include non-volatile memory and/or volatile memory, including, but not limited to, Electrically Erasable Programmable Read-Only Memory (EEPROM), Read-Only Memory (ROM), Programmable Read-Only Memory (PROM), Random Access Memory (RAM), Dynamic Random Access Memory (DRAM), Static Random Access Memory (SRAM), flash, magnetic disk drive, and/or optical disk drive. The storage device 1040 can include an internal storage device, an attached storage device (including detachable and non-detachable storage devices), and/or a network accessible storage device, as non-limiting examples.

System 1000 includes an encoder/decoder module 1030 configured, for example, to process data to provide an encoded video or decoded video, and the encoder/decoder module 1030 can include its own processor and memory. The encoder/decoder module 1030 represents module(s) that can be included in a device to perform the encoding and/or decoding functions. As is known, a device can include one or both of the encoding and decoding modules. Additionally, encoder/decoder module 1030 can be implemented as a separate element of system 1000 or can be incorporated within processor 1010 as a combination of hardware and software as known to those skilled in the art.

Program code to be loaded onto processor 1010 or encoder/decoder 1030 to perform the various aspects described in this document can be stored in storage device 1040 and subsequently loaded onto memory 1020 for execution by processor 1010. In accordance with various embodiments, one or more of processor 1010, memory 1020, storage device 1040, and encoder/decoder module 1030 can store one or more of various items during the performance of the processes described in this document. Such stored items can include, but are not limited to, the input video, the decoded video or portions of the decoded video, the bitstream, matrices, variables, and intermediate or final results from the processing of equations, formulas, operations, and operational logic.

In some embodiments, memory inside of the processor 1010 and/or the encoder/decoder module 1030 is used to store instructions and to provide working memory for processing that is needed during encoding or decoding. In other embodiments, however, a memory external to the processing device (for example, the processing device can be either the processor 1010 or the encoder/decoder module 1030) is used for one or more of these functions. The external memory can be the memory 1020 and/or the storage device 1040, for example, a dynamic volatile memory and/or a non-volatile flash memory. In several embodiments, an external non-volatile flash memory is used to store the operating system of, for example, a television. In at least one embodiment, a fast external dynamic volatile memory such as a RAM is used as working memory for video coding and decoding operations, such as for MPEG-2 (MPEG refers to the Moving Picture Experts Group, MPEG-2 is also referred to as ISO/IEC 13818, and 13818-1 is also known as H.222, and 13818-2 is also known as H.262), HEVC (HEVC refers to High Efficiency Video Coding, also known as H.265 and MPEG-H Part 2), or WC (Versatile Video Coding, a new standard being developed by JVET, the Joint Video Experts Team).

The input to the elements of system 1000 can be provided through various input devices as indicated in block 1130. Such input devices include, but are not limited to, (i) a radio frequency (RF) portion that receives an RF signal transmitted, for example, over the air by a broadcaster, (ii) a Component (COMP) input terminal (or a set of COMP input terminals), (iii) a Universal Serial Bus (USB) input terminal, and/or (iv) a High Definition Multimedia Interface (HDMI) input terminal. Other examples, not shown in FIG. 19, include composite video.

In various embodiments, the input devices of block 1130 have associated respective input processing elements as known in the art. For example, the RF portion can be associated with elements suitable for (i) selecting a desired frequency (also referred to as selecting a signal, or band-limiting a signal to a band of frequencies), (ii) downconverting the selected signal, (iii) band-limiting again to a narrower band of frequencies to select (for example) a signal frequency band which can be referred to as a channel in certain embodiments, (iv) demodulating the downconverted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, downconverting the received signal to a lower frequency (for example, an intermediate frequency or a near-baseband frequency) or to baseband. In one set-top box embodiment, the RF portion and its associated input processing element receives an RF signal transmitted over a wired (for example, cable) medium, and performs frequency selection by filtering, downconverting, and filtering again to a desired frequency band. Various embodiments rearrange the order of the above-described (and other) elements, remove some of these elements, and/or add other elements performing similar or different functions. Adding elements can include inserting elements in between existing elements, such as, for example, inserting amplifiers and an analog-to-digital converter. In various embodiments, the RF portion includes an antenna.

Additionally, the USB and/or HDMI terminals can include respective interface processors for connecting system 1000 to other electronic devices across USB and/or HDMI connections. It is to be understood that various aspects of input processing, for example, Reed-Solomon error correction, can be implemented, for example, within a separate input processing IC or within processor 1010 as necessary. Similarly, aspects of USB or HDMI interface processing can be implemented within separate interface ICs or within processor 1010 as necessary. The demodulated, error corrected, and demultiplexed stream is provided to various processing elements, including, for example, processor 1010, and encoder/decoder 1030 operating in combination with the memory and storage elements to process the datastream as necessary for presentation on an output device.

Various elements of system 1000 can be provided within an integrated housing, Within the integrated housing, the various elements can be interconnected and transmit data therebetween using suitable connection arrangement, for example, an internal bus as known in the art, including the Inter-IC (12C) bus, wiring, and printed circuit boards.

The system 1000 includes communication interface 1050 that enables communication with other devices via communication channel 1060. The communication interface 1050 can include, but is not limited to, a transceiver configured to transmit and to receive data over communication channel 1060. The communication interface 1050 can include, but is not limited to, a modem or network card and the communication channel 1060 can be implemented, for example, within a wired and/or a wireless medium.

Data is streamed, or otherwise provided, to the system 1000, in various embodiments, using a wireless network such as a Wi-Fi network, for example IEEE 802.11 (IEEE refers to the Institute of Electrical and Electronics Engineers). The Wi-Fi signal of these embodiments is received over the communications channel 1060 and the communications interface 1050 which are adapted for Wi-Fi communications. The communications channel 1060 of these embodiments is typically connected to an access point or router that provides access to external networks including the Internet for allowing streaming applications and other over-the-top communications. Other embodiments provide streamed data to the system 1000 using a set-top box that delivers the data over the HDMI connection of the input block 1130. Still other embodiments provide streamed data to the system 1000 using the RF connection of the input block 1130. As indicated above, various embodiments provide data in a non-streaming manner. Additionally, various embodiments use wireless networks other than Wi-Fi, for example a cellular network or a Bluetooth network.

The system 1000 can provide an output signal to various output devices, including a display 1100, speakers 1110, and other peripheral devices 1120. The display 1100 of various embodiments includes one or more of, for example, a touchscreen display, an organic light-emitting diode (OLED) display, a curved display, and/or a foldable display. The display 1100 can be for a television, a tablet, a laptop, a cell phone (mobile phone), or other device. The display 1100 can also be integrated with other components (for example, as in a smart phone), or separate (for example, an external monitor for a laptop). The other peripheral devices 1120 include, in various examples of embodiments, one or more of a stand-alone digital video disc (or digital versatile disc) (DVR, for both terms), a disk player, a stereo system, and/or a lighting system. Various embodiments use one or more peripheral devices 1120 that provide a function based on the output of the system 1000. For example, a disk player performs the function of playing the output of the system 1000.

In various embodiments, control signals are communicated between the system 1000 and the display 1100, speakers 1110, or other peripheral devices 1120 using signaling such as AV.Link, Consumer Electronics Control (CEC), or other communications protocols that enable device-to-device control with or without user intervention. The output devices can be communicatively coupled to system 1000 via dedicated connections through respective interfaces 1070, 1080, and 1090. Alternatively, the output devices can be connected to system 1000 using the communications channel 1060 via the communications interface 1050. The display 1100 and speakers 1110 can be integrated in a single unit with the other components of system 1000 in an electronic device such as, for example, a television. In various embodiments, the display interface 1070 includes a display driver, such as, for example, a timing controller (T Con) chip.

The display 1100 and speaker 1110 can alternatively be separate from one or more of the other components, for example, if the RF portion of input 1130 is part of a separate set-top box. In various embodiments in which the display 1100 and speakers 1110 are external components, the output signal can be provided via dedicated output connections, including, for example, HDMI ports, USB ports, or COMP outputs.

The embodiments can be carried out by computer software implemented by the processor 1010 or by hardware, or by a combination of hardware and software. As a non-limiting example, the embodiments can be implemented by one or more integrated circuits. The memory 1020 can be of any type appropriate to the technical environment and can be implemented using any appropriate data storage technology, such as optical memory devices, magnetic memory devices, semiconductor-based memory devices, fixed memory, and removable memory, as non-limiting examples. The processor 1010 can be of any type appropriate to the technical environment, and can encompass one or more of microprocessors, general purpose computers, special purpose computers, and processors based on a multi-core architecture, as non-limiting examples.

Various implementations involve decoding. "Decoding", as used in this application, can encompass all or part of the processes performed, for example, on a received encoded sequence in order to produce a final output suitable for display. In various embodiments, such processes include one or more of the processes typically performed by a decoder, for example, entropy decoding, inverse quantization, inverse transformation, and differential decoding. In various embodiments, such processes also, or alternatively, include processes performed by a decoder of various implementations described in this application, for example, receiving, for a block being decoded in a picture, an information for decoding mode; determining, for the block being decoded, a set of predictor candidates, wherein for at least one current potential predictor candidate in a set of potential predictor candidates, the current potential predictor candidate is added to the set of predictor candidates in case the current potential predictor candidate is different from any predictor candidate in a subset of predictor candidates from the set of predictor candidates; and decoding the block based on the received information and the set of predictor candidates.

As further examples, in one embodiment "decoding" refers only to entropy decoding, in another embodiment "decoding" refers only to differential decoding, and in another embodiment "decoding" refers to a combination of entropy decoding and differential decoding. Whether the phrase "decoding process" is intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in this application can encompass all or part of the processes performed, for example, on an input video sequence in order to produce an encoded bitstream. In various embodiments, such processes include one or more of the processes typically performed by an encoder, for example, partitioning, differential encoding, transformation, quantization, and entropy encoding. In various embodiments, such processes also, or alternatively, include processes performed by an encoder of various implementations described in this application, for example, determining, for the block being encoded, a set of predictor candidates wherein, for at least one current potential predictor candidate in a set of potential predictor candidates, the current potential predictor candidate is added to the set of predictor candidates in case the current potential predictor candidate is different from any predictor candidate in a subset of predictor candidates from the set of predictor candidates; and encoding the block based on a predictor candidate from set of predictor candidates.

As further examples, in one embodiment "encoding" refers only to entropy encoding, in another embodiment "encoding" refers only to differential encoding, and in another embodiment "encoding" refers to a combination of differential encoding and entropy encoding. Whether the phrase "encoding process" is intended to refer specifically to a subset of operations or generally to the broader encoding process will be clear based on the context of the specific descriptions and is believed to be well understood by those skilled in the art.

Note that the syntax elements as used herein, for example, Merge_idx, Merge_flag, Inter, are descriptive terms. As such, they do not preclude the use of other syntax element names.

When a figure is presented as a flow diagram, it should be understood that it also provides a block diagram of a corresponding apparatus. Similarly, when a figure is presented as a block diagram, it should be understood that it also provides a flow diagram of a corresponding method/process.

The implementations and aspects described herein can be implemented in, for example, a method or a process, an apparatus, a software program, a data stream, or a signal. Even if only discussed in the context of a single form of implementation (for example, discussed only as a method), the implementation of features discussed can also be implemented in other forms (for example, an apparatus or program). An apparatus can be implemented in, for example, appropriate hardware, software, and firmware. The methods can be implemented in, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, means that a particular feature, structure, characteristic, and so forth described in connection with the embodiment is included in at least one embodiment.

Thus, the appearances of the phrase "in one embodiment" or "in an embodiment" or "in one implementation" or "in an implementation", as well any other variations, appearing in various places throughout this application are not necessarily all referring to the same embodiment.

Additionally, this application may refer to "determining" various pieces of information. Determining the information can include one or more of, for example, estimating the information, calculating the information, predicting the information, or retrieving the information from memory.

Further, this application may refer to "accessing" various pieces of information. Accessing the information can include one or more of, for example, receiving the information, retrieving the information (for example, from memory), storing the information, moving the information, copying the information, calculating the information, determining the information, predicting the information, or estimating the information.

Additionally, this application may refer to "receiving" various pieces of information. Receiving is, as with "accessing", intended to be a broad term. Receiving the information can include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Also, as used herein, the word "signal" refers to, among other things, indicating something to a corresponding decoder. For example, in certain embodiments the encoder signals a particular one of a plurality of construction of the candidate lists, or the number N of candidates in the subset used for comparison. In this way, in an embodiment the same parameter is used at both the encoder side and the decoder side. Thus, for example, an encoder can transmit (explicit signaling) a particular parameter to the decoder so that the decoder can use the same particular parameter. Conversely, if the decoder already has the particular parameter as well as others, then signaling can be used without transmitting (implicit signaling) to simply allow the decoder to know and select the particular parameter. By avoiding transmission of any actual functions, a bit savings is realized in various embodiments. It is to be appreciated that signaling can be accomplished in a variety of ways. For example, one or more syntax elements, flags, and so forth are used to signal information to a corresponding decoder in various embodiments. While the preceding relates to the verb form of the word "signal", the word "signal" can also be used herein as a noun.

As will be evident to one of ordinary skill in the art, implementations can produce a variety of signals formatted to carry information that can be, for example, stored or transmitted. The information can include, for example, instructions for performing a method, or data produced by one of the described implementations. For example, a signal can be formatted to carry the bitstream of a described embodiment. Such a signal can be formatted, for example, as an electromagnetic wave (for example, using a radio frequency portion of spectrum) or as a baseband signal. The formatting can include, for example, encoding a data stream and modulating a carrier with the encoded data stream. The information that the signal carries can be, for example, analog or digital information. The signal can be transmitted over a variety of different wired or wireless links, as is known. The signal can be stored on a processor-readable medium.

We describe a number of embodiments. Features of these embodiments can be provided alone or in any combination. Further, embodiments can include one or more of the following features, devices, or aspects, alone or in any combination, across various claim categories and types:

- Limiting the unicity pruning by only comparing the current candidate to the N last candidates in the list during a candidate list creation process for motion compensation applied in the decoder and/or encoder.
- Re-ordering the candidates in the candidates list creation process for motion compensation in the decoder and/or encoder.
- Limiting the comparisons for pruning to a subset of the list, instead of all elements in the list.
- Limiting to the N last elements in the list/set of candidates.
- Reordering the list creation dynamically to put likely similar candidates close together in the list.
- Setting close in the list the candidates which are spatially close.
- Taking in to account the block size to select the spatially close candidates.
- For affine candidates, taking into account the corners location
- In an encoding method, determining, for the block being encoded, a set of predictor candidates, the determining comprising, for at least one current potential predictor candidate in a set of potential predictor candidates, adding the current potential predictor candidate to the set of predictor candidates in case the current potential predictor candidate is different from any predictor candidate in a subset of predictor candidates from the set of predictor candidates; and encoding the block based on a predictor candidate from set of predictor candidates.
- In an decoding method, receiving, for a block being decoded in a picture, an information for decoding mode; determining, for the block being decoded, a set of predictor candidates, the determining comprising, for at least one current potential predictor candidate in a set of potential predictor candidates, adding the current potential predictor candidate to the set of predictor candidates in case the current potential predictor candidate is different from any predictor candidate in a subset of predictor candidates from the set of predictor candidates; and decoding the block based on the received information and the set of predictor candidates.

Inserting in the signaling syntax elements that enable the decoder to identify the list creation process method to use.

Selecting, based on these syntax elements, the method to apply at the decoder.

Applying the candidate creation list method for deriving the motion information at the decoder.

A bitstream or signal that includes one or more of the described syntax elements, or variations thereof.

Creating and/or transmitting and/or receiving and/or decoding a bitstream or signal that includes one or more of the described syntax elements, or variations thereof.

A TV, set-top box, cell phone, tablet, or other electronic device that performs motion compensation in a decoding method according to any of the embodiments described.

A TV, set-top box, cell phone, tablet, or other electronic device that performs motion compensation in a decoding method according to any of the embodiments described, and that displays (e.g. using a monitor, screen, or other type of display) a resulting image.

A TV, set-top box, cell phone, tablet, or other electronic device that tunes (e.g. using a tuner) a channel to receive a signal including an encoded image, and that performs motion compensation in a decoding method according to any of the embodiments described.

A TV, set-top box, cell phone, tablet, or other electronic device that receives (e.g. using an antenna) a signal over the air that includes an encoded image, and performs that performs motion compensation in a decoding method according to any of the embodiments described.

The invention claimed is:

1. A method, comprising:
receiving, for a block being decoded in a picture, information indicating a decoding mode;
determining, for the block being decoded, a first set of predictor candidates, the determining comprising:
ordering potential predictor candidates in a second set of predictor candidates based on a distance between the predictor candidates, the ordering comprises:
adding a candidate, of the potential predictor candidates, to the second set, and
further adding candidates, of the remaining potential predictor candidates, to the second set, wherein each added candidate is with the largest distance from the candidate previously added to the second set,
for at least one predictor candidate in the second set, determining that the predictor candidate is different from any predictor candidate in a subset of predictor candidates from the first set and responsively adding the predictor candidate to the first set,
wherein the subset of predictor candidates comprises a last N predictor candidates in the first set, N being an integer between 1 and a maximum number of candidates in the first set; and
decoding the block based on the received information and the first set of predictor candidates.

2. The method of claim 1, wherein N is set to 2, and the ordering comprises:
adding a candidate, of the remaining potential predictor candidates, with the largest distance from the firstly added candidate followed by adding a candidate, of the remaining potential predictor candidates, with the smallest distance from the firstly added candidate.

3. The method of claim 1, wherein the second set of predictor candidates comprises spatial and temporal predictor candidates and wherein the distance between the predictor candidates comprises a spatial distance and a temporal distance.

4. The method of claim 1, wherein the ordering of the potential predictor candidates is further based on relative positions between the potential predictor candidates, the relative positions comprising left, above right, left bottom, above, and above left.

5. The method of claim 1, wherein the ordering of the potential predictor candidates is adaptive to a size of the block.

6. The method of claim 1, wherein the ordering of the potential predictor candidates is further based on relative positions between the potential predictor candidates, the relative positions comprising left, above right, left bottom, above, above left.

7. The method of claim 1, wherein after adding at least N candidates, of the potential predictor candidates, to the second set, the adding further comprises:
adding a candidate, of the remaining potential predictor candidates, with the largest distance from an added candidate at 1 position away and with the smallest distance from an added candidate at N positions away.

8. An apparatus comprising one or more processors, wherein the one or more processors are configured to:
receive, for a block being decoded in a picture, information indicating a decoding mode;
determine, for the block being decoded, a first set of predictor candidates, the determining comprising:
ordering potential predictor candidates in a second set of predictor candidates based on a distance between the predictor candidates, the ordering comprises:
adding a candidate, of the potential predictor candidates, to the second set, and
further adding candidates, of the remaining potential predictor candidates, to the second set, wherein each added candidate is with the largest distance from the candidate previously added to the second set,
for at least one predictor candidate in the second set, on condition that the predictor candidate is different from any predictor candidate in a subset of predictor candidates from the first set, adding the predictor candidate to the first set,
wherein the subset of predictor candidates comprises a last N predictor candidates in the first set, N being an integer between 1 and a maximum number of candidates in the first set; and
decode the block based on the received information and the first set of predictor candidates.

9. The apparatus of claim 8, wherein N is set to 2, and the ordering comprises:
adding a candidate, of the remaining potential predictor candidates, with the largest distance from the firstly added candidate followed by adding a candidate, of the remaining potential predictor candidates, with the smallest distance from the firstly added candidate.

10. The apparatus of claim 8, wherein the second set of predictor candidates comprises spatial and temporal predictor candidates and wherein the distance between the predictor candidates comprises a spatial distance and a temporal distance.

11. The apparatus of claim 8, wherein the ordering of the potential predictor candidates is further based on relative positions between the potential predictor candidates, the relative positions comprising left, above right, left bottom, above, and above left.

12. The apparatus of claim 8, wherein the ordering of the potential predictor candidates is adaptive to a size of the block.

13. A method, comprising:
   determining, for a block being encoded, a first set, the determining comprising:
      ordering potential predictor candidates in a second set of predictor candidates based on a distance between the predictor candidates, the ordering comprises:
         adding a candidate, of the potential predictor candidates, to the second set, and
         further adding candidates, of the remaining potential predictor candidates, to the second set, wherein each added candidate is with the largest distance from the candidate previously added to the second set,
      for at least one predictor candidate in the second set, determining that the candidate is different from any candidate in a subset of predictor candidates from the first set and responsively adding the candidate to the first set,
      wherein the subset of predictor candidates comprises a last N predictor candidates in the first set, N being an integer between 1 and a maximum number of candidates in the first set; and
   encoding the block based on a candidate from the first set of predictor candidates.

14. The method of claim 13, wherein N is set to 2, and the ordering comprises:
   adding a candidate, of the remaining potential predictor candidates, with the largest distance from the firstly added candidate followed by adding a candidate with the smallest distance from the firstly added candidate.

15. The method of claim 13, wherein the second set of predictor candidates comprises spatial and temporal predictor candidates and wherein the distance between the predictor candidates comprises a spatial distance and a temporal distance.

16. The method of claim 13, wherein after adding at least N candidates, of the potential predictor candidates, to the second set, the adding further comprises:
   adding a candidate, of the remaining potential predictor candidates, with the largest distance from an added candidate at 1 position away and with the smallest distance from an added candidate at N positions away.

17. An apparatus comprising one or more processors, wherein the one or more processors are configured to:
   determine, for a block being encoded, a first set of predictor candidates, the determining comprising:
      ordering potential predictor candidates in a second set of predictor candidates based on a distance between the predictor candidates, the ordering comprises:
         adding a candidate, of the potential predictor candidates, to the second set, and
         further adding candidates, of the remaining potential predictor candidates, to the second set, wherein each added candidate is with the largest distance from the candidate previously added to the second set,
      for at least one candidate in the second set, on condition that the predictor candidate is different from any predictor candidate in a subset of predictor candidates from the first set, adding the predictor candidate to the first set,
      wherein the subset of predictor candidates comprises a last N predictor candidates in the first set, N being an integer between 1 and a maximum number of candidates in the first set; and
   encode the block based on a predictor candidate from the first predictor set.

18. The apparatus of claim 17, wherein N is set to 2, and the ordering comprises:
   adding a candidate, of the remaining potential predictor candidates, with the largest distance from the firstly added candidate followed by adding a candidate with the smallest distance from the firstly added candidate.

19. The apparatus of claim 17, wherein the second set of predictor comprises spatial and temporal predictor candidates and wherein the distance between the predictor candidates comprises a spatial distance and a temporal distance.

20. The apparatus of claim 17, wherein the order of predictor candidates is further based on relative positions between predictor candidates, the relative positions comprising left, above right, left bottom, above, and above left.

* * * * *